US010437718B1

(12) United States Patent
Anghel et al.

(10) Patent No.: US 10,437,718 B1
(45) Date of Patent: Oct. 8, 2019

(54) COMPUTERIZED METHODS FOR PREFETCHING DATA BASED ON MACHINE LEARNED SEQUENCES OF MEMORY ADDRESSES

(71) Applicant: International Business Machines Corporation, Armonk, NY (US)

(72) Inventors: Andreea Anghel, Adliswil (CH); Peter Altevogt, Ettlingen (DE); Gero Dittmann, Zurich (CH); Cedric Lichtenau, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/964,498

(22) Filed: Apr. 27, 2018

(51) Int. Cl.
G06F 12/00 (2006.01)
G06F 12/02 (2006.01)
G06N 3/08 (2006.01)
G06N 20/00 (2019.01)

(52) U.S. Cl.
CPC ........... *G06F 12/0215* (2013.01); *G06N 3/08* (2013.01); *G06N 20/00* (2019.01); *G06F 2212/1016* (2013.01)

(58) Field of Classification Search
None
See application file for complete search history.

(56) References Cited

U.S. PATENT DOCUMENTS

| 5,003,471 A * | 3/1991 | Gibson | G06F 9/3802 710/56 |
| 2008/0133877 A1 * | 6/2008 | Chai | G06F 9/345 711/218 |
| 2013/0346703 A1 * | 12/2013 | McCauley | G06F 12/0862 711/137 |
| 2014/0054997 A1 * | 2/2014 | Miyashita | H02K 1/276 310/156.01 |
| 2017/0091104 A1 | 3/2017 | Rafacz et al. | |

(Continued)

OTHER PUBLICATIONS

Kim, Jinchun, et al., "Lookahead Prefetching with Signature Path", Electrical and Computer Engineering, Texas A & M University, 4 pgs.

(Continued)

*Primary Examiner* — John A Lane
(74) *Attorney, Agent, or Firm* — Harrington & Smith

(57) ABSTRACT

A method of prefetching data is provided including monitoring sequences of memory addresses of data being accessed by a system, whereby sequences of m+1 memory addresses each are continually identified; and for each identified sequence: converting, upon identifying said each sequence, memory addresses of said each sequence into m relative addresses, whereby each of the m relative addresses is relative to a previous memory address in said each sequence, so as to obtain an auxiliary sequence of m relative addresses; upon converting said memory addresses, feeding said auxiliary sequence of m relative addresses as input to a trained machine learning model for it to predict p relative addresses of next memory accesses by the system, where p≥1; and prefetching data at memory locations associated with one or more memory addresses that respectively correspond to one or more of the p relative addresses predicted.

20 Claims, 7 Drawing Sheets

(56) References Cited

U.S. PATENT DOCUMENTS

2017/0168947 A1    6/2017  Lesecq et al.

OTHER PUBLICATIONS

Sair, Suleyman, et al., "Quantifying Load Stream Behavior", In Proceedings of the 8th International Symposium on High Performance Computer Architecture (HPCA), Feb. 2002, 12 pgs.
Zhu, Huaiyu, et al., "Timing Local Streams: Improving Timeliness in Data Prefetching", ICS'10, Jun. 2-4, 2010, 10 pgs.
Joseph, Doug, et al., "Prefetching using Markov Predictors", ACM 1997, pp. 252-263.
Shevgoor, Manjunath, et al., "Efficiently Prefetching Complex Address Patterns", 48th International Symposium on Microarchitecture MICRO-48, Dec. 5-9, 2015, 12 pgs.
Sherwood, Timothy, et al., "Predictor-Directed Stream Buffers", IEEE, 2000, pp. 42-53.
Ishii, Yasuo, et al., "Access Map Pattern Matching for High Performance Data Cache Prefetch", Journal of Instruction-Level Parallelism 13, 2011, 24 pgs.
Jouppi, Norman P., "Improving Direct-Mapped Cache Performance by the Addition of a Small Fully-Associative Cache and Prefetch Buffers", Western Research Laboratory, Mar. 1990, 46 pgs.
Iacobovici, Sorin, et al. "Effective stream-based and execution-based data prefetching" international conference on Supercomputing (ICS), Jun. 26-Jul. 1, 2004, SaintMalo, France. 11 pgs.

\* cited by examiner

|   | 1 | 2 | 3 | 4 | 5 | 6 |
|---|---|---|---|---|---|---|
| 1 | 0x00000142 | 0x00000143 | 0x00000144 | 0x00000145 | 0x00000146 | 0x00000147 |
| 2 | 0x00000146 | 0x00000147 | 0x00000149 | 0x00000149 | 0x00000145 | 0x00000149 |
| 3 | 0x00000145 | 0x00000149 | 0x00000151 | 0x00000153 | 0x00000157 | 0x00000162 |
| 4 | 0x00000157 | 0x00000162 | 0x00000167 | 0x00000172 | 0x00000177 | 0x00000182 |

FIG. 7A

|   | 1 | 2 | 3 | 4 | 5 |
|---|---|---|---|---|---|
| 1 | 1 | 1 | 1 | 1 | 1 |
| 2 | 1 | 2 | 0 | -4 | 4 |
| 3 | 4 | 2 | 2 | 4 | 5 |
| 4 | 5 | 5 | 5 | 5 | 5 |

COMPUTERIZED METHODS FOR PREFETCHING DATA BASED ON MACHINE LEARNED SEQUENCES OF MEMORY ADDRESSES

BACKGROUND

Various example embodiments relate in general to the field of computerized methods and systems for prefetching data, and more particularly to methods that rely on cognitive algorithms to learn sequences of relative memory addresses.

Data prefetching is an approach to reducing the latency of memory operations in computerized systems. Data prefetching can improve the performance of modern microprocessors, by proactively fetching useful data blocks from long-latency memory to faster cache memory, ahead of access requests. Prefetching techniques have also been applied to data storage systems.

Ideally, a prefetching algorithm should predict future access requests with high accuracy. Prefetching techniques are known, which predict future accesses based on past memory accesses, e.g., based upon learning of past access requests. Such techniques are inherently limited by the number of previously monitored access patterns. Several prefetching methods are otherwise known, which are limited to regular memory access patterns of consecutive memory addresses or of addresses at constant distance in memory. Such methods have limited applications.

SUMMARY

According to a first aspect, a computerized method of prefetching data in a computer system is provided. This system is adapted to access data from memory addresses, in operation. This method relies on monitoring sequences of memory addresses of data being accessed by the system, whereby sequences of m+1 memory addresses each, m≥2, are continually identified. For each sequence of the sequences of m+1 memory addresses identified, memory addresses of said each sequence are converted (upon identifying said each sequence) into m relative addresses, whereby each of the m relative addresses is relative to a previous memory address in said each sequence, so as to obtain an auxiliary sequence of m relative addresses. Next, upon converting said memory addresses, said auxiliary sequence of m relative addresses is fed as input to a trained machine learning model for it to predict p relative addresses of next memory accesses by the system, p≥1. Finally, data is prefetched at memory locations associated with one or more memory addresses that respectively correspond to one or more of the p relative addresses predicted.

According to another aspect, a computer system is provided, which is configured to monitor sequences of memory addresses, convert such memory addresses, feed auxiliary sequences accordingly obtained, so as to prefetch data at memory locations associated with memory addresses corresponding to predicted relative addresses, consistently with the above method.

According to another aspect, a computer program product for prefetching data in a computer system such as described above is provided. The computer program product comprises a computer readable storage medium having program instructions embodied therewith, wherein the program instructions are executable by one or more processors to cause to implement all the steps of a method such as described above, or in any embodiment thereof.

Computerized systems, methods, and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIGS. 7A-7C exemplify memory addresses as consumed and produced in embodiments of a method such as captured in FIG. 1. In detail:

- FIG. 7A shows a set of sequences of absolute memory addresses, as initially considered by a method according to embodiments;
- FIG. 7B depicts a corresponding table of relative memory addresses, as provided to a cognitive algorithm for learning purposes, as in embodiments; and
- FIG. 7C depicts a table similar to that of FIG. 7B, where the first three columns correspond to values given as input to a trained model, and the last two columns correspond to predictions by the trained model, wherein each predicted (relative) memory address is complemented by a confidence score (or probability), as in embodiments.

The accompanying drawings show simplified representations of devices or parts thereof, as involved in embodiments. Similar or functionally similar elements in the figures have been allocated the same numeral references, unless otherwise indicated.

DETAILED DESCRIPTION OF EMBODIMENTS OF THE INVENTION

Figure 1:
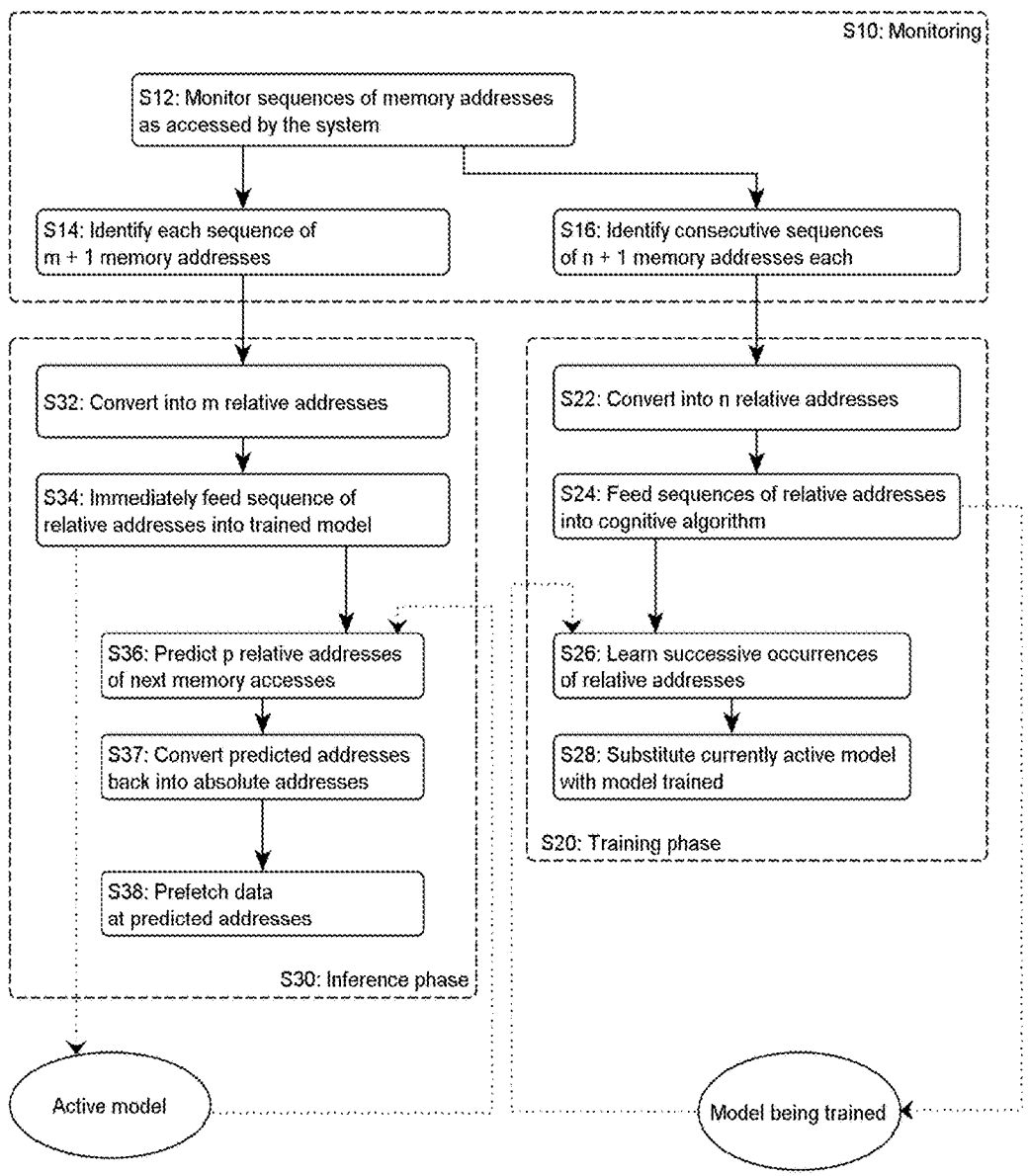
FIG. 1 is a flowchart illustrating high-level steps of a method of prefetching data in a computer system, based on sequences of relative memory addresses fed into a trained machine learning model, according to embodiments. The model is re-trained in parallel, as involved in embodiments.

In reference to FIG. 1, an aspect of the invention is first described, which concerns a computerized method of prefetching data in a computer system 1. The system is assumed to be configured to access data via memory addresses (e.g., upon requests from client and/or applications 1). This system is later described in detail in reference to FIGS. 5 and 6.

Basically, the present method aims at predicting relative addresses of next memory accesses by the system. This phase is called "inference phase", and is generally referred to as step S30 in FIG. 1. To that aim, the present method monitors sequences of memory addresses of data being accessed by the system. While monitoring such accesses, sequences of m+1 memory addresses each (m≥2) are continually identified. I.e., each sequence identified includes m+1 memory addresses.

Such memory addresses are references to specific locations in memory (e.g., cache memory, main memory or other memory storage means), which locations may be used at various levels by software and/or hardware of the computer system 1 to access corresponding resources. In all cases, such memory addresses form a homogeneous set of addresses. I.e., they are defined at a same level of memory. They can be either physical or logical addresses.

For each of the sequences identified, the m+1 memory addresses of each sequence are converted (step S32 in FIG. 1) into m relative addresses. Each conversion is triggered upon identifying S14 each sequence, e.g., on-the-fly, as soon as a new sequence of m+1 memory addresses is identified S14.

As known, a relative memory address represents some distance from a reference address (such as the first byte of any stored data), whereby the corresponding, absolute address can be retrieved by adding this distance to the reference address. E.g., given a first (absolute) address 0x00000142 and a second (absolute) address 0x00000143, the relative address of the second address can be considered to be 1, i.e., the numeral gap between 0x00000142 and 0x00000143, as otherwise illustrated in FIGS. 7A and 7B for a set of N=4 sequences of six absolute addresses (FIG. 7A) and five corresponding relative addresses (FIG. 7B).

In the present method, each of the m relative addresses is relative to a previous memory address in a respective one of the sequences identified. I.e., each relative address refers to a distance between two addresses in a same sequence. Now, each relative addresses may be relative to any previous memory address in the same sequence, e.g., an immediately preceding address in the sequence or a same, fixed reference address (for example the first address in that sequence). Best, however, is to use the immediately preceding address (as assumed in FIG. 7B), as this likely gives rise to more redundancies in the values of the sequences accordingly obtained, making the resulting patterns easier to learn by a cognitive algorithm.

Repeating this process for each address and each sequence identified S14, an auxiliary sequence is obtained S32 for each sequence identified S14, where each auxiliary sequence now includes m relative addresses, owing to the conversion made (for example, m=5 in FIG. 7).

Next, the auxiliary sequence (i.e., of m relative addresses) is fed S34 as input to a trained machine learning model 36. Again, this step S34 should occur as soon as possible, after having converted S32 the sequence. This makes it possible for the trained machine learning model to predict (step S36) p relative addresses (p≥1) of next memory accesses by the system and, this, for each of the auxiliary sequences considered as input.

Finally, data are prefetched S38 from memory locations associated with memory addresses that respectively correspond S37 to the p relative addresses predicted at step S36. To that aim, the corresponding addresses are typically converted S37 back into absolute addresses, prior to fetching corresponding data via a memory controller.

In other words, the present method applies a cognitive algorithm that continually uses sequences of relative addresses to predict next relative addresses, whereby data corresponding to predicted addresses can be subsequently fetched to proactively improve efficiency in the data provision by the system 1. As explained later in detail, relying on relative addresses makes it easier to learn memory address patterns and further is advantageous to handle scenarios of repeating memory address patterns at different address offsets, which in turn results in more efficient inferences. The present method is accordingly not limited to regular memory access patterns of mere consecutive memory addresses or of addresses at constant distance in memory. It is in fact applicable to any memory access pattern and, in particular, to complex memory access patterns.

In preferred embodiments, the cognitive model is retrained in parallel with the inference phase, e.g., by updating a previous model to incorporate the latest memory access behavior, so as for the currently active model to constantly adapt to the on-going workload. In variants, however, the model might be trained from scratch, taking any dataset as input, e.g., to capture temporary memory access behaviors.

A same cognitive algorithm may be constantly relied on. In variants, however, several cognitive algorithms may be used to concurrently train several model, or the cognitive algorithm may be changed, e.g., depending on a context.

Note that, in the literature, the terms "cognitive algorithm", "cognitive model", "machine learning model" or the like are often interchangeably used. In an effort to clarify terminologies, one may tentatively adopt the following definition: a machine learning model is generated by a cognitive algorithm, which learns its parameter(s) from input data points, so as to arrive at this model. Thus, a distinction can be made between the cognitive algorithm used to train a model (i.e., the model being trained) and the model that eventually results (here called "trained model", or "retrained model") upon completion of the training.

In embodiments, each next relative addresses is predicted with an associated probability, i.e., with a certain confidence value, which depends on the patterns learned by the underlying cognitive algorithm. Namely, each auxiliary sequence of m relative addresses is fed S34 as input to a trained model 36 for it to predict S36 p relative addresses of next memory accesses by the system, each with a respective probability of access.

Figure 3:
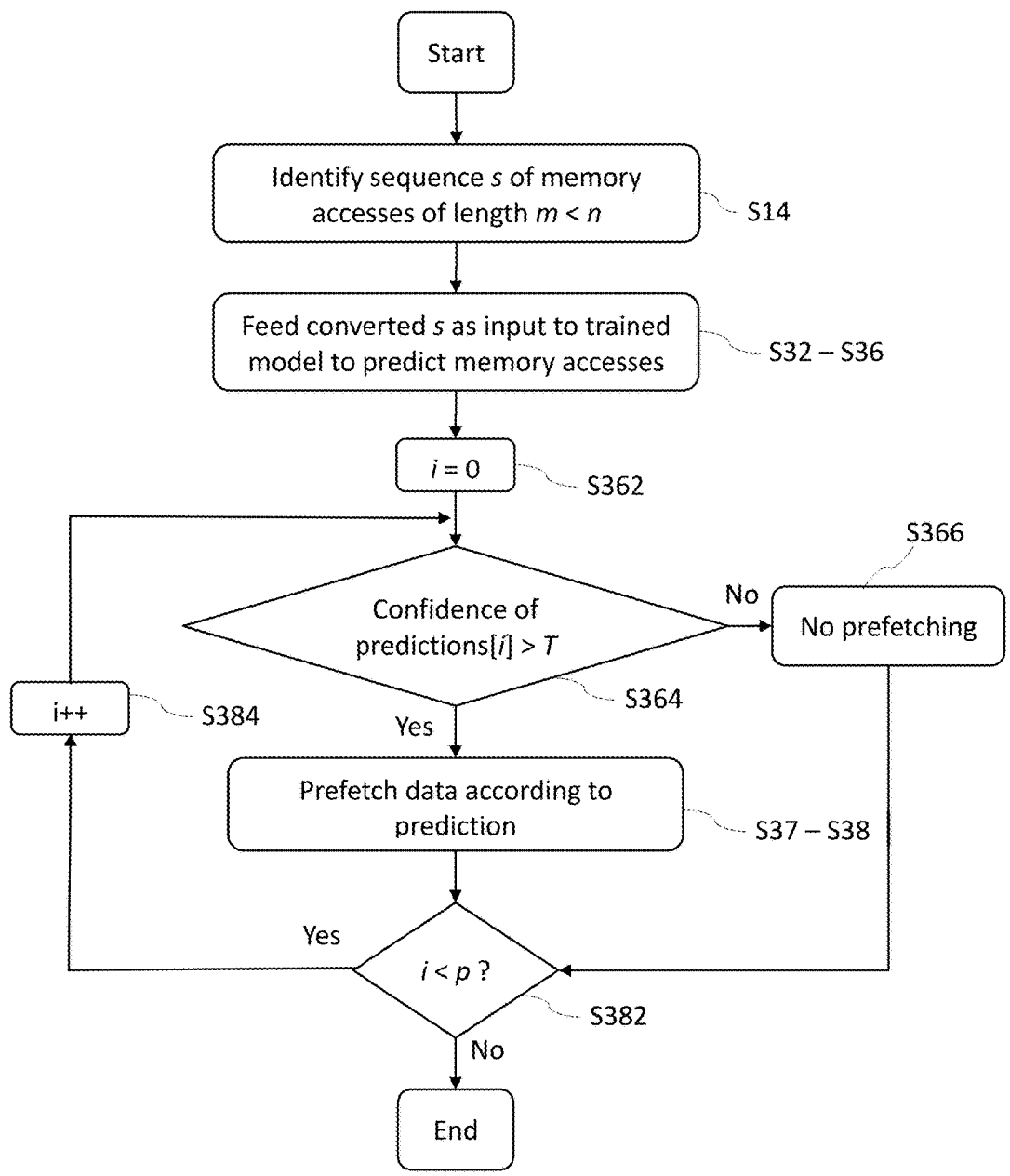
FIG. 3 is a flowchart exemplifying an inference phase of a method for prefetching data, assuming a sequence-by-sequence processing by a trained machine learning model, as in embodiments.

In that case, data can subsequently be prefetched S38 based on probabilities of access as respectively associated with the p relative addresses as predicted at step S36 by the trained model 36. I.e., the probabilities outputted by the trained model can be used to decide whether to prefetch the corresponding data, or not. Data may for instance be prefetched only if the probability of the predicted outcome exceeds S364 a given threshold T, as reflected in FIG. 3. For example, a counter, i, may be initiated at S362 and incremented at S384 to check each value in an array of confidence values (i.e. predictions) against threshold T at S364. If the confidence value is greater than the threshold then the data is prefetched according to the prediction as shown at S37-S38. If the confidence value is not greater than the threshold than there is no prefetching of the corresponding data as shown at S366. The counter is incremented while i<p as shown at S382. This threshold T may possibly be adaptively set, e.g., depending on the current workload of the system.

Sequences of memory addresses fetched by the system 1 may for instance be continuously monitored S12, so as to allow consecutive sequences of addresses of a current workload of the system 1 to be identified S14, S16 in the monitored sequences. Similarly, consecutive sequences of addresses may be identified at step S16 and fed S22, S24 into the cognitive algorithm, so as to ease the pattern recognition. Thus, the sequences identified at step S14 and S16 may in each case consist of consecutive sequences, so as for patterns learned during the learning phase S20 to be consistently exploited during the inference phase S30.

In more detail, a cognitive algorithm may be trained S20 (see in particular steps S22-S26) concurrently to the inference phase S30, in view of obtaining S26 a newly trained model. Upon completion of the training, the currently active model 36 may be substituted S28 with the newly trained model 26, which can henceforth be used to predict S36 relative addresses of next memory accesses by the system.

Figure 4:
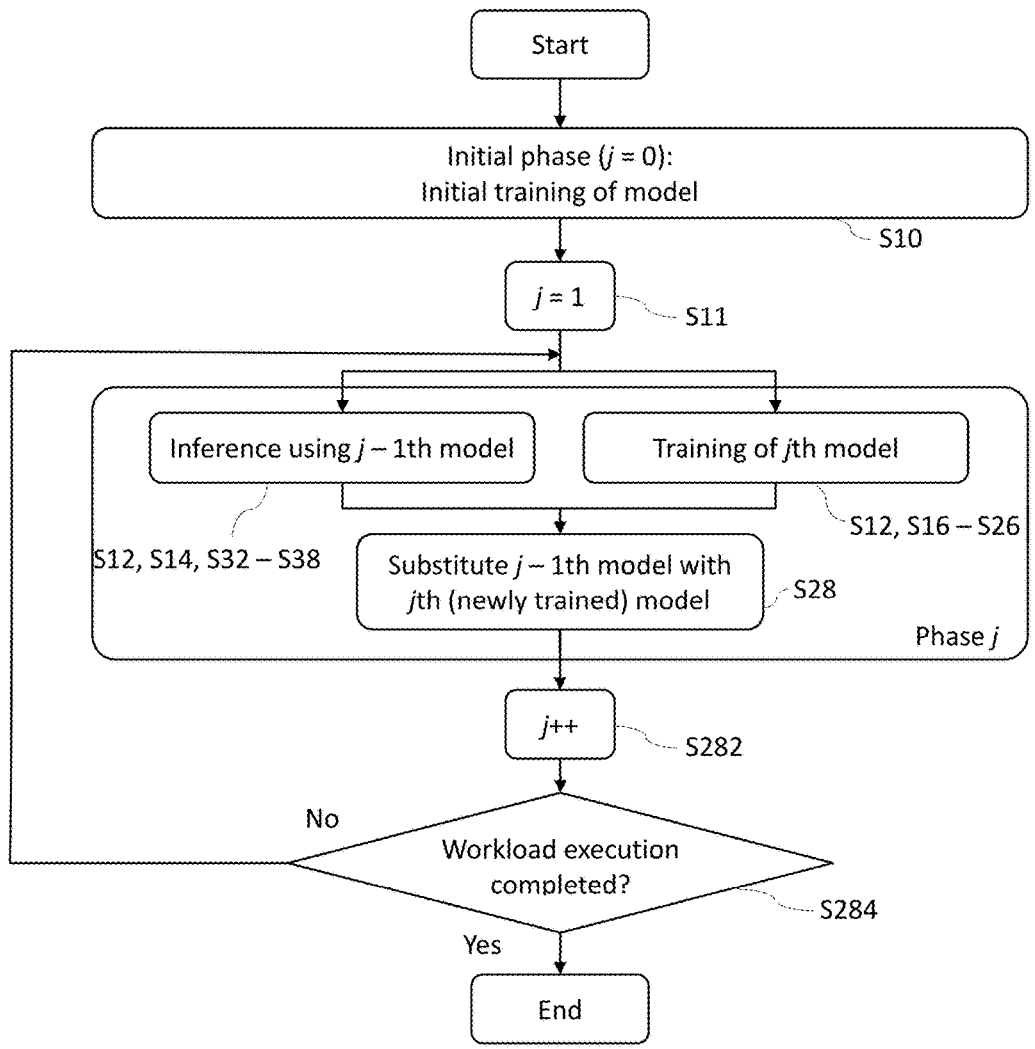
FIG. 4 is a flowchart illustrating how a machine learning model can be repeatedly re-trained during inference phases of a method as in FIG. 3, and substituted to a currently active model, as in embodiments.

The model is preferably continually retrained, i.e., the substitution process is incessantly repeated. For example, as illustrated in FIG. 4, an initial model is trained at S10 when j=0. Then, j is incremented at S11. Assuming that the currently active model 36 was trained during a $j-1^{th}$ phase (call it the $j-1^{th}$ model), a cognitive algorithm may be trained S22-S26 during a $j^{th}$ phase (concurrently to phase S30), in order to obtain a $j^{th}$ trained machine learning model. Upon completion, the $j-1^{th}$ trained model is substituted S28 with the $j^{th}$ trained model, which becomes the new active model, used for prediction purposes S36. At S282, j is incremented and the process repeats until workload execution is completed at S284. This way, the model used at the inference stage S30 is continually updated (i.e., at more or less regular time intervals), so as to be kept apprised of the latest patterns observed.

As evoked earlier, the training S22-S26 of the $j^{th}$ model is preferably based on sets of consecutive sequences. Each set accordingly comprises several, consecutive sequences of addresses, where each sequence now comprises n+1 memory addresses, where n>m. Reasons for doing so will become apparent later. Such sets are identified at step S16, within the monitored S12 sequences, during a current workload of the system 1.

Again, the n+1 memory addresses of each sequence of each set identified at step S16 need be converted S22 into n relative addresses. Similarly to the inference phase S30, each of the n relative addresses is relative to a previous memory address in the same sequence (e.g., the immediately preceding address or a same reference address). That is, the same scheme as in the inference phase is adopted to compute the relative addresses, for consistency reasons. This way, an auxiliary set of sequences is obtained S22, where each sequence of the auxiliary set comprises n relative addresses.

Finally, the auxiliary set of sequences obtained at step S22 is fed S24 as input to the cognitive algorithm (or added to an existing pool of sequences considered by the algorithm) for it to learn S26 or update relative address patterns. I.e., the algorithm learns successive occurrences of relative addresses, as occurring during a current workload. The auxiliary set of consecutive sequences of relative addresses are preferably passed to the cognitive algorithm during the same current workload as that during which inferences are made thanks to the currently active model 36 (i.e., the $j-1^{th}$ trained model). Upon completing the training, the model being trained is substituted S28 to the currently active model, such that a continually updated model is made available for the inference phase S30.

Figure 2:
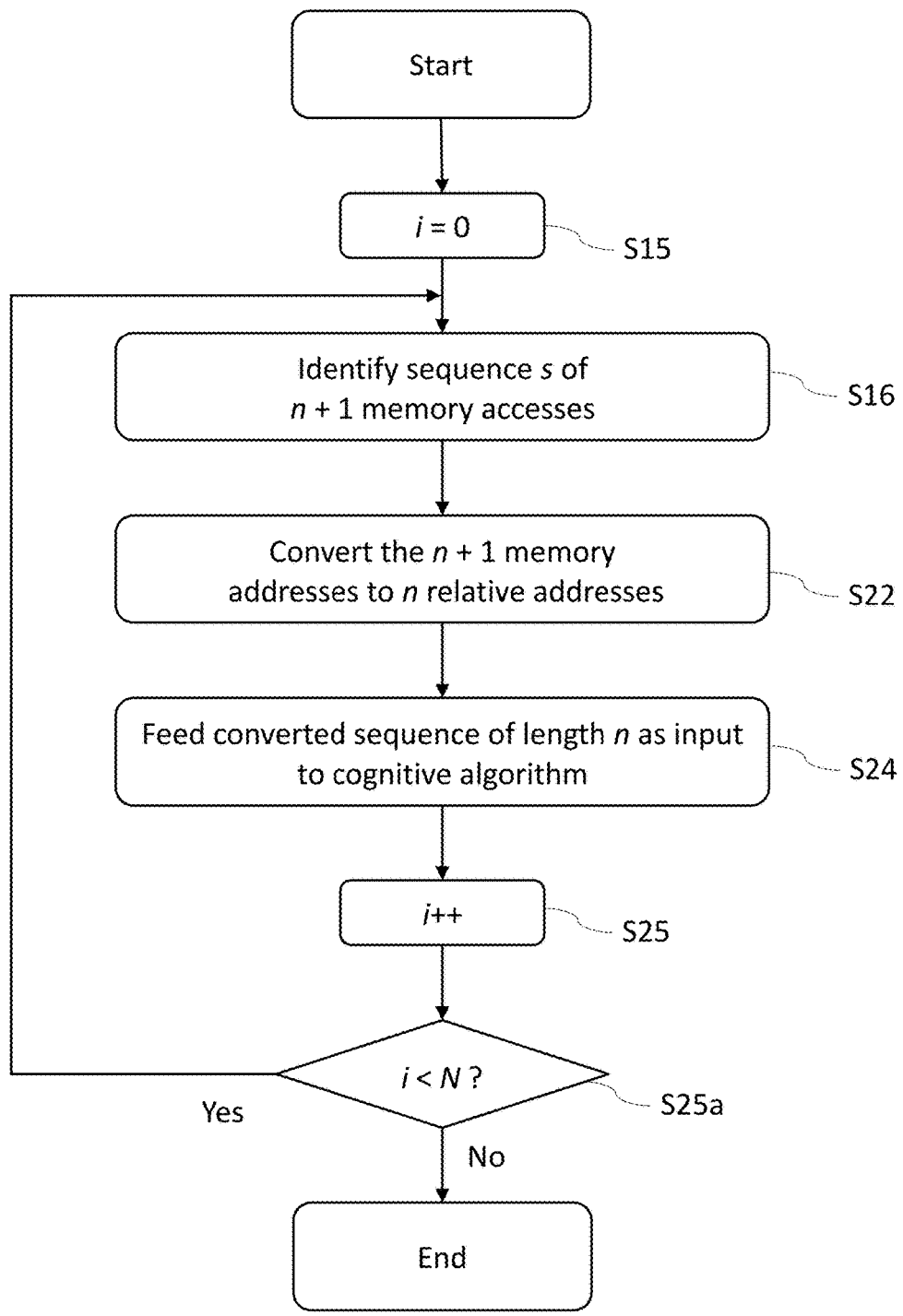
FIG. 2 is a flowchart depicting a learning phase, so as to train (or retrain) a model that is subsequently used for prefetching data, as in embodiments.

Note that that even if sets of sequences are considered for learning, auxiliary sequences can be fed one at a time to the cognitive model, as illustrated in the flowchart of FIG. 2.

At present, the structures and dimensions of the sequences respectively used for learning S20 and for prefetching S30 are described in more detail. As noted earlier, n is strictly larger than m, such that the cognitive algorithm learns longer patterns than those actually used as input during the inference phase S30. And this precisely allows the trained model to better infer the remainder of the sequence of m relative addresses it receives as input for inference purposes S30. It is sufficient to impose n=m+p, with p≥1, i.e., meaning that p inferences are to be made for each relative sequence of m addresses considered as input S34, S36. I.e., p corresponds to the number of relative addresses predicted S36 during inference phases S30.

Consecutive sequences are preferably used for learning purposes S20, such that the learning process S20 may be regarded as a process learning successive columns of relative addresses. Some correspondence exist between sequences used at steps S20 and S30. Preferably, the first m columns of the n columns fed S24 as input to the cognitive algorithm during the learning phase S20 correspond to the same m columns of values used S34 in each sequence for inference purposes S30, as assumed in FIGS. 7B and 7C. In other words, each of the consecutive sequences of n+1 memory addresses of each set of sequences learned preferably starts with the same m+1 memory addresses as the consecutive sequences of m+1 memory addresses identified for prefetching purposes S30. This makes it simpler for the trained model to recognize patterns and infer remaining addresses. For example, p logistic regression models may be used to predict S36 values corresponding to columns m+1, m+2, . . . m+p. In variants, a neural network is used, which will likely provide more accurate predictions.

In detail, FIG. 7B shows relative addresses obtained, each, as the difference between address k (k>1) and the immediately preceding address k−1 in each of the N=4 sequences (rows) of the set shown in FIG. 7A. A set of sequences of relative addresses as shown in FIG. 7B may for example be used for learning purposes S20, though the number of sequences is typically much larger in practice. FIG. 7C shows the same columns of relative addresses as in FIG. 7B, except that the first three columns (m=3 in this example) of the four sequences shown are assumed to be given as input (one sequence at a time) to a currently active model, which in this case results in predicting p=2 values (n=3+2=5) of relative addresses per sequence. The predicted values make up the last two columns of values shown in FIG. 7C. The predicted values are complemented by confidence scores (probabilities of occurrence), as provided by the trained model.

As seen in FIG. 7C, a very high confidence is obtained for the pairs {1, 1} and {5, 5} in the last two columns of FIG. 7C, which pairs come after input sequences of repeated relative addresses, i.e., respectively {1, 1, 1} and {5, 5, 5}. On the contrary, the pairs {−4, 4} and {4, 5}, corresponding to the second and third rows, come with lower probabilities, because the patterns learned by the cognitive algorithm are assumed to make the full sequences (i.e., {1, 2, 0, −4, 4} and {4, 2, 2, 4, 5}) less likely in this example. More generally, the confidence scores depend on the patterns learned and thus on the sets of sequences considered by the cognitive algorithm during the training phase S20.

In variants, the cognitive algorithm may learn much longer sequences than those actually used to challenge the currently active model at step S34. In addition, sets of sequences are preferably fed to the cognitive algorithm. Thus, the first m columns of the n columns used at S20 need not strictly correspond to the same m columns as used at inference S30. However, each set of consecutive sequences of n+1 addresses used for learning S20 may typically include sequences of m+1 addresses that are concurrently used for inferences S30, such that some overlap may occur. This way, the training phase S20 takes into account at least some of the latest occurrences of memory accesses. That is, during a same phase j, the set of consecutive sequences of n+1 addresses used for training S20 and the consecutive sequences of m+1 addresses used for inferences S30 preferably overlap (e.g., so as to have one or more sequences of m+1 memory addresses in common).

As said above, the sets of sequences passed to the learning algorithm S20 preferably start with the same sequences as used by the inference module S30, be it to ease the implementation. Still, comments are in order. First, the learning task may, in general, possibly be partly or fully de-correlated from the inference phase, such that the sets of sequences used for the training phase S20 need not exactly correspond to the sets used for inferences S30. For example, the learning task can be simplified by passing only a subset of the sequences identified at step S14 to the learning phase S20. In that case, the sequences used at steps S20 and S30 would only partly correspond at each phase j. Also, the sequences may not correspond at all, e.g., when training sets of addresses are used for learning purposes, irrespective of memory accesses actually observed. In addition, beyond the actual sequences used in each case, the sequences themselves may differ in length (n>m).

The example of FIGS. 7A-7C nevertheless assume overlapping columns. That is, the set of sequences as identified at step S16 (i.e., consecutive sequences of n+1 addresses) for the training S20 corresponds to consecutive sequences of m+1 addresses as identified at step S14 for the inference stage S30. Namely, each sequence of the set starts with the same m+1 memory addresses that make up the consecutive sequences used for inference purposes. Still, the sequences considered for training purposes S20 further comprise, each, p additional memory addresses, yielding p=2 additional relative addresses in FIG. 7B, i.e., p additional columns, compared to the m=3 columns taken as input for inference purposes, FIG. 7C.

In that respect, one understands that if each sequence of the sets used for learning starts with the same m+1 addresses as used for inferences, then steps S14 and S16 can be implemented as a single step, during which consecutive sequences of n+1 addresses (each) are identified. A single conversion steps S22/S32 can be implemented, wherein sequences are converted upon identification. Yet, sequences of only m addresses are considered for inference purposes S30 (one at a time), whereas sequences of n addresses are considered for learning S20.

In variants, the inference process S30 may actually consider any m consecutive (relative) addresses of a set as depicted in FIG. 7B and make predictions S36 based on those. Such variants, however, are expected to be less accurate than those in which the sequences used for learning S24 start, each, with the same m relative addresses as the sequences used S34 for inference S36.

In examples of preferred embodiments, the training phase S20 comprises:

At S15, i is initialized to 0;
Identifying S16 sequences of n+1 memory accesses in a current workload;
Converting S22 the identified sequences of n+1 addresses to n addresses relative to the immediately preceding address in each sequence;
Providing S24 the converted sequences of length n as input to the cognitive algorithm; and
Incrementing i at step S25;
Stopping S25a after N sequences (i.e. when i≥N).
Concurrently, the inference phase S30 comprises:
Identifying S14 sequences of m+1 memory accesses in the current workload (n=m+p, with p≥1, such that n≥m+1);
Converting S32 each sequence of m+1 addresses into m addresses relative to the immediately preceding address therein (or simply selecting the first m relative addresses of the sequences processed at steps S16 and S22, such that step S14 would be skipped);
Providing S34 the converted m-length sequences (one by one, on-the-fly) as input to a currently active model (i.e., the model trained during a previous training phase S20), for it to predict S36 the next p accesses; and
Prefetching S38 data according to predictions made by the cognitive algorithm, taking into account probabilities associated with the next accesses inferred.

At inference time, a single sequence of relative addresses is used S34, S36 at a time. Based S34 on one single sequence, the algorithm predicts S36 the next p relative addresses that will be used for prefetching S38 (after conversion S37 to absolute addresses). On the training side however, multiple sequences can be considered for the cognitive algorithm to learn S20 patterns.

In practice, as soon as m+1 memory accesses occurred, an inference sequence of m relative addresses can be created in order to immediately predict the next p addresses and then prefetch data at the corresponding memory locations. When applied to cache memory, such a scheme likely brings corresponding cache lines with target data from high-latency memory (e.g., DRAM) to low-latency memory (e.g., L1/L2 cache). This way, when next memory accesses occur (i.e., the $(m+2)^{th}$, $(m+3)^{th}$, ... access), the requested data is, with high probability, already available from one the low-latency cache memories of the processor. This increases the performance of the system. An assumption here is that the n memory accesses do not occur very fast, e.g., one memory access per nanosecond, thus making the prefetching mechanism all the more effective.

The above example of preferred embodiments is reflected in the flowcharts of FIGS. 1-4. Remind, however, that the flowchart of FIG. 2 relies on a sequence-by-sequence learning process, whereas the corresponding part of the process shown in FIG. 1 may possibly rely on entire sets of sequences fed into the cognitive algorithm at step S24.

The number of sequences considered in FIGS. 7A-7C is purposely limited, for the sake of concision and understanding. In practice, the number N of sequences taken in consideration (be it for inference or learning purposes) should typically be on the order of 100, or larger, in order to obtain reasonably accurate predictions. Similarly, larger N values improve the accuracy of the trained models. Very good results will be obtained in practice if N≥1000 (or even N≥2000). The number of relative addresses used for inferences is preferably between 4 and 8, which happens to work well in practice, while the number p of additional addresses considered at step S24 is typically larger than or equal to 2. More preferably though, p is kept relatively small, e.g., between 2 and 4.

The machine learning models (as trained or retrained during successive phases j) are preferably implemented by a neural network. In this case, the neurons in the output layer of the neural network are used to predict the probabilities of the next p memory accesses for each sequence fed S34 as input. In variants, mere logistic regressions can be used. Such algorithms are known per se.

Figure 5:
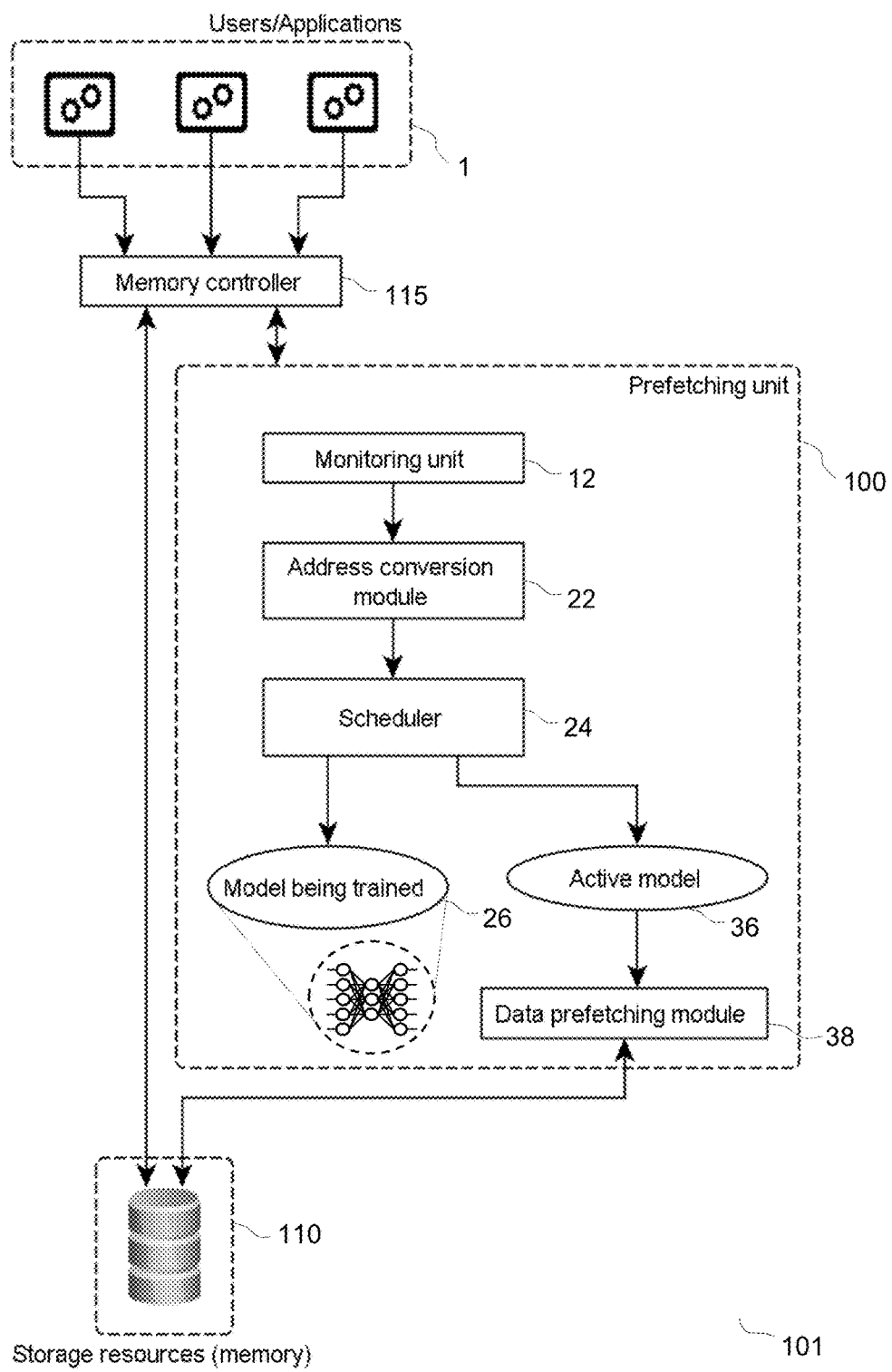
FIG. 5 is a block diagram schematically illustrating selected components of a system according to embodiments.
Figure 6:
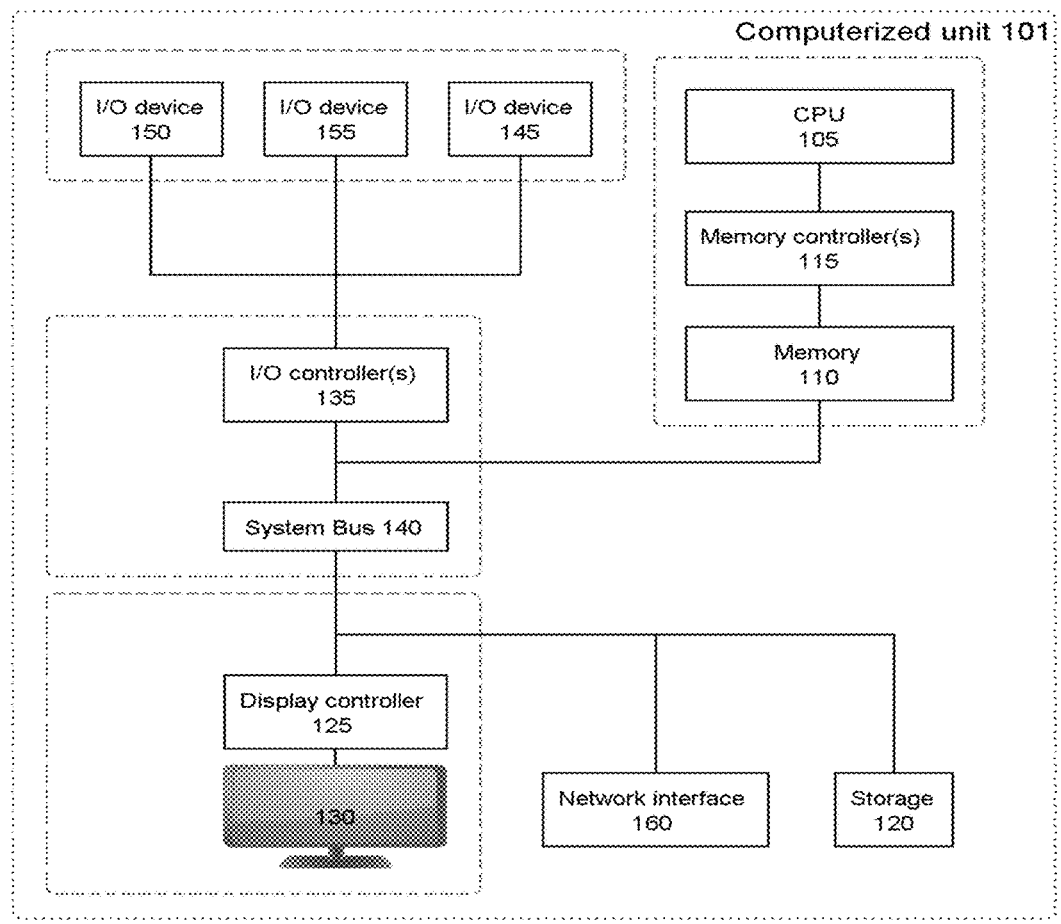
FIG. 6 schematically represents a general purpose computerized system, suited for implementing one or more method steps as involved in embodiments of the invention.

Referring more specifically to FIGS. 5 and 6, another aspect of the invention is now described, which concerns a computer system 1. As said, the system 1 is assumed to be adapted to access data based on memory addresses, e.g., so as to serve requests from users and/or client applications 1. This system is generally configured to implement steps according the methods described earlier.

For example, the system 1 may comprise storage means 110 (i.e., memory) storing data, which are accessible at (from) given memory locations. The present concepts may in principle be implemented in and for any types of memory means, i.e., any hardware devices involved to store information for use in or by a computer system. This may notably include primary storage means (i.e., main memory) or slower access storage means. Yet, the present prefetching mechanisms can advantageously be directed to applications to processor cache memory, as exemplified earlier.

The system 1 further comprises processing means 105, e.g., including a central processing unit (CPU), so as to carry out computerized instructions. In particular, such processing means may be involved in the execution of a number of computerized modules, thereby forming a prefetching unit 100, within a machine 101, which, as whole, is configured to implement steps of the methods described earlier. The prefetching unit 100 typically communicates with a memory controller 115 of the system 1, to prefetch data corresponding to predictions S36.

The computerized modules may notably include a monitoring unit 12, for monitoring sequences of addresses accessed by the system 1, and an address conversion module 22, designed to convert S32 memory addresses of input sequences into relative addresses, as explained earlier. A scheduler 24 is in charge of feeding S34 relative addresses obtained into the trained model 36 for it to predict S36 relative addresses of next memory accesses. A data prefetching module 38 is further provided, which is in data communication with the storage means 110, so as to prefetch S38 data at memory locations associated with memory addresses that correspond to relative addresses as predicted S36, in operation.

In embodiments, the system 1 further comprises a training unit, which is designed for training S22-S26 a cognitive algorithm, based on monitored S12 sequences of memory addresses, in order to train or retrain the model and obtain newly trained models. The training unit may for instance be implemented as part of the scheduler 24, to train the model concurrently to the inference phase S30, as explained earlier. The scheduler 24 may further be adapted to substitute S28 the trained model with the newly trained model, upon completion of the training, for the substituted model to predict S36 further memory accesses, in operation of the system 1.

More generally, computerized devices can be suitably designed for implementing embodiments of the present invention as described herein, starting with computerized methods as described earlier. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, the system 1 depicted in FIG. 6 schematically represents a computerized unit 101, e.g., a general-purpose computer. In exemplary embodiments, in terms of hardware architecture, as shown in FIG. 6, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, a system bus 140 may include address, control, and/or data connections to enable appropriate communications among the aforementioned components of system 1.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

A CPU cache is typically provided to reduce the access times to access data from the main memory, which cache may include both instruction and data caches, wherein the data cache is preferably organized as a hierarchy of cache levels (L1, L2, etc.). The present data prefetching schemes can advantageously be applied to the data cache, as exemplified earlier.

The software in memory 110 may include one or more separate programs, each of which comprises an ordered listing of executable instructions for implementing logical functions. In the example of FIG. 6, the software in the memory 110 includes methods described herein in accordance with exemplary embodiments and a suitable operating system (OS). The OS essentially controls the execution of other computer programs, such as the methods as described herein, and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices.

In addition, the I/O devices 145-155 may further include devices that communicate both inputs and outputs. The system 1 can further include a display controller 125 coupled to a display 130. In exemplary embodiments, the system 1 can further include a network interface or transceiver 160 for coupling to a network 165.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS, in whole or in part are read by the processor 105, typically buffered within the processor 105, and then executed. When the methods described herein are implemented in software, the methods can be stored on any computer readable medium, such as storage 120, for use by or in connection with any computer related system or method.

Next, according to a final aspect, the invention can be embodied as a computer program product for prefetching data in a computer system 1 as described above. This computer program product comprises a computer readable storage medium having program instructions embodied therewith, wherein the program instructions are executable by one or more processors, to cause to take steps according to the present methods.

Thus, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A computerized method of prefetching data in a computer system adapted to access data from memory addresses, the method comprising:
   monitoring sequences of memory addresses of data being accessed by the system, whereby sequences of m+1 memory addresses each, wherein $m \geq 2$, are continually identified; and
   for each sequence of the sequences of m+1 memory addresses identified:
   converting, upon identifying said each sequence, memory addresses of said each sequence into m relative addresses, whereby each of the m relative addresses is relative to a previous memory address in said each sequence, so as to obtain an auxiliary sequence of m relative addresses;
   upon converting said memory addresses, feeding said auxiliary sequence of m relative addresses as input to a trained machine learning model for it to predict p relative addresses of next memory accesses by the system, wherein $p \geq 1$; and
   prefetching data at memory locations associated with one or more memory addresses that respectively correspond to one or more of the p relative addresses predicted.

2. The method according to claim 1, wherein:
   said auxiliary sequence of m relative addresses is fed as input to the trained model for it to predict said p relative addresses, each with a respective probability of access; and
   said data is prefetched based on probabilities of access respectively associated with the one or more of the p relative addresses predicted by the trained model.

3. The method according to claim 2, wherein
   said data is prefetched only if respectively associated probabilities of access exceed a given threshold.

4. The method according to claim 1, wherein:
   at monitoring said sequences, said sequences of m+1 memory addresses are identified as consecutive sequences of memory addresses of data being accessed by the system.

5. The method according to claim 4, wherein the method further comprises:
   training, based on the monitored sequences of memory addresses, a cognitive algorithm, concurrently to feeding auxiliary sequences of relative addresses as input to the trained model for it to predict relative addresses of next memory accesses by the system, in order to obtain a newly trained model; and
   substituting the trained model with the newly trained model for the latter to predict further relative addresses of next memory accesses by the system.

6. The method according to claim 5, wherein
   the trained model used for predicting relative addresses of next memory accesses by the system is a $j-1^{th}$ model, the latter trained during a $j-1^{th}$ phase, and
   the method further comprises, during a $j^{th}$ phase:
   training, based on the monitored sequences of memory addresses, said cognitive algorithm, concurrently to feeding auxiliary sequences of relative addresses as input to the $j-1^{th}$ trained model, in order to obtain a $j^{th}$ trained machine learning model; and substituting the $j-1^{th}$ trained model with the $j^{th}$ trained model, for the latter to predict further relative addresses of next memory accesses by the system.

7. The method according to claim 6, wherein
a number N of sequences of said each set of consecutive sequences of n+1 memory addresses identified is equal to or larger than 100.

8. The method according to claim 6, wherein
each $j^{th}$ machine learning model is implemented by a neural network.

9. The method according to claim 6, wherein training the $j^{th}$ model comprises:
continually identifying, in the monitored sequences, sets of consecutive sequences of n+1 memory addresses each, where n>m; and
for each set of said sets of consecutive sequences identified:
converting memory addresses of each of the sequences of said each set into n relative addresses, whereby each of the n relative addresses is relative to a previous memory address in said each of the sequences of said each set, so as to obtain an auxiliary set of sequences of n relative addresses each; and
feeding said auxiliary set of sequences as input to the cognitive algorithm for it to learn successive occurrences of relative addresses in the auxiliary set.

10. The method according to claim 9, wherein $n=m+p$.

11. The method according to claim 10, wherein $p\geq 2$.

12. The method according to claim 10, wherein
said each set of said sets of consecutive sequences of n+1 memory addresses includes one or more of the sequences of m+1 memory addresses identified.

13. The method according to claim 12, wherein
each of the consecutive sequences of n+1 memory addresses of said each set
starts with the same m+1 memory addresses as the consecutive sequences of m+1 memory addresses identified for prefetching data, and
further comprises p additional memory addresses.

14. A computer system comprising:
at least one processor; and
at least one non-transitory memory including computer program code, the at least one memory and the computer program code configured to, with the at least one processor, cause the computer system to:
monitor sequences of memory addresses of data being accessed by the system, in operation, whereby sequences of m+1 memory addresses each, wherein m 2, are continually identified; and
for each sequence of the sequences of m+1 memory addresses identified:
convert, upon identifying said each sequence, memory addresses of said each sequence into m relative addresses, whereby each of the m relative addresses is relative to a previous memory address in said each sequence, so as to obtain an auxiliary sequence of m relative addresses;
upon converting said memory addresses, feed said auxiliary sequence of m relative addresses as input to a trained machine learning model for it to predict p relative addresses of next memory accesses by the system, wherein $p\geq 1$; and
prefetch data at memory locations associated with one or more memory addresses that respectively correspond to one or more of the p relative addresses predicted.

15. The computer system according to claim 14, wherein the at least one non-transitory memory including computer program code, the at least one memory and the computer program code are configured to, with the at least one processor, cause the computer system to:
train, based on the monitored sequences of memory addresses, a cognitive algorithm, concurrently to feeding auxiliary sequences of relative addresses as input to the trained model for it to predict relative addresses of next memory accesses by the system, in order to obtain a newly trained model; and
substitute the trained model with the newly trained model for the latter to predict further relative addresses of next memory accesses by the system.

16. A computer program product for prefetching data in a computer system adapted to access data from memory addresses, the computer program product comprising a non-transitory computer readable storage medium having program instructions embodied therewith, the program instructions executable by one or more processors, to cause the computer system to:
monitor sequences of memory addresses of data being accessed by the system, whereby sequences of m+1 memory addresses each, wherein $m\geq 2$, are continually identified; and
for each sequence of the sequences of m+1 memory addresses identified:
convert, upon identifying said each sequence, memory addresses of said each sequence into m relative addresses, whereby each of the m relative addresses is relative to a previous memory address in said each sequence, so as to obtain an auxiliary sequence of m relative addresses;
upon converting said memory addresses, feed said auxiliary sequence of m relative addresses as input to a trained machine learning model for it to predict p relative addresses of next memory accesses by the system, wherein $p\geq 1$; and
prefetch data at memory locations associated with one or more memory addresses that respectively correspond to one or more of the p relative addresses predicted.

17. The computer program product according to claim 16, wherein the program instructions are executable by the one or more processors, to cause
the trained model to predict said p relative addresses of next memory accesses by the system with respective probability of accesses, wherein $p\geq 1$, and
to prefetch said data based on probabilities of access respectively associated with said p relative addresses predicted by the trained model.

18. The computer program product according to claim 17, wherein the program instructions are executable by the one or more processors, to cause to
prefetch said data only if respectively associated probabilities of access exceed a given threshold.

19. The computer program product according to claim 16, wherein the program instructions are executable by the one or more processors, to further cause, at monitoring said sequences, to:
identify said sequences of m+1 memory addresses as consecutive sequences of memory addresses of data being accessed by the system.

20. The computer program product according to claim 16, wherein the program instructions are executable by the one or more processors, to further cause to:

train, based on the monitored sequences of memory addresses, a cognitive algorithm, concurrently to feeding auxiliary sequences of relative addresses as input to the trained model for it to predict relative addresses of next memory accesses by the system, in order to obtain a newly trained model; and substitute the trained model with the newly trained model for the latter to predict further relative addresses of next memory accesses by the system.

\* \* \* \* \*